Patented Sept. 6, 1949

2,481,257

UNITED STATES PATENT OFFICE 2,481,257

LUBRICATING COMPOSITION

Miller W. Swaney, Cranford, and George E. Serniuk, Roselle, N. J., assignors to Standard Oil Development Company, a corporation of Delaware No Drawing. Application March 8, 1946, Serial No. 653,178

7 Claims. (Cl. 252—45)

This invention relates to improvement in lubricating qualities of hydrocarbon oils and particularly to improvements in viscosity characteristics by blending hydrocarbon lubricating oils with certain oil soluble condensation products.

Improved designs in internal combustion engines used in automobiles, aircraft and also boats and the extremes of temperatures of maintenance and operation have placed such heavy service demands thereon that hydrocarbon oils alone are in many cases unsuitable as lubricants. The deficiencies of hydrocarbon oils as lubricants in engines which are subjected to widely varying extremes of heat and cold have in large measure been overcome by blending therewith a variety of additive materials which serve to improve the pour properties or the viscosity index of the oil.

It is the object of this invention to provide the art with hydrocarbon lubricants of improved viscosity characteristics.

It is a further object of this invention to provide the art with hydrocarbon lubricants containing novel additives which serve to improve the viscosity characteristics of the lubricants.

These and other objects will appear more clearly from the detailed description and claims which follow.

It has now been found that the viscosity characteristics of hydrocarbon lubricants are improved if there are added thereto small amounts of the adducts obtained by condensing certain mercaptans with the double bonds of certain unsaturated rubbery organic materials. Specifically, it has been found that the condensation products of primary aliphatic mercaptans of from 8 to 18 carbon atoms per molecule with vulcanizable rubber-like materials such as sodium or peroxide catalyzed mass polymerizates or emulsion polymerizates of conjugated diolefin hydrocarbons of from about 4 to 6 carbon atoms per molecule such as butadiene, isoprene, piperylene, methyl pentadiene and dimethylbutadiene and sodium or peroxide catalyzed mass copolymerizates or emulsion copolymerizates of varying proportions of the said diolefins and copolymerizable compounds such as styrene, alpha methyl styrene, para methyl styrene, alpha methyl para methyl styrene, vinyl naphthalene, vinyl pyridiene, methyl acrylate, methyl methacrylate, ethyl fumarate and the like are particularly effective as additives for improving the viscosity characteristics of hydrocarbon lubricants. The preferred mercaptans contain about 12 to 18 carbon atoms, particularly suitable product being the mixture of primary mercaptans obtainable from mixed cocoanut oil alcohols or other commercial $C_{12}$ alcohol.

The condensation of the mercaptans with the double bonds in the rubbery hydrocarbons derived from sodium or peroxide catalyzed mass polymerization or emulsion polymerization of the above mentioned monomers can be achieved by reacting the mercaptans with the solid polymer, such as on the rubber mill or by reacting the mercaptan with the rubbery polymer in solution in a solvent such as benzene using a peroxide-type catalyst or the mercaptan can be added to a latex of the rubbery hydrocarbon material, in the presence of peroxide-type catalysts. The process for condensing mercaptans with the double bonds of rubbery organic materials is described in considerable detail in copending application Serial No. 532,359, filed April 22, 1944, by M. W. Swaney (now abandoned) and in application Serial No. 638,519 filed December 29, 1945, by M. W. Swaney and F. W. Banes.

By properly controlling concentrations, reaction temperatures and the like, the amount of mercaptan condensing with the polymer can be varied from zero to substantially 100%, in the latter case a substantially completely saturated polymer-type product being obtained. It is ordinarily preferred that at least 50% of the double bonds in the product be reacted with mercaptan. In some cases, if the rubbery material contains a large number of double bonds, it is desirable to substantially saturate the adduct, for example by subjecting the adduct to hydrogenation.

The adducts are usually added to the lubricating oil in amounts of between about 0.05 and 10 wt. per cent, preferably about 0.15 to 1.5 wt. per cent based on the oil.

The following examples will serve to illustrate the present invention but it will be understood that our invention is not limited to the specific details described.

Example 1

Two hundred grams of fresh polybutadiene of high molecular weight in the form of a latex, prepared by heating an emulsion of butadiene in a 2½% soap solution containing 0.15% $K_2S_2O_8$ and 0.3% $C_{12}$ mercaptan at 50° C. for about 18 hours, and containing about 25% of rubbery solids, was diluted to about 500 mls. with 2½ Na-soap solution containing 0.2 gram $K_2S_2O_8$. This mixture was placed in a glass reactor, and to it was added 50 grams of a mercaptan mixture which contained a preponderating amount of n-dodecyl mercaptan made from commercial alcohols derived from cocoanut oil. The vessel was closed and agitated at 50° C. for several days, further amounts of said mercaptan mixture were added at intervals until in all about 200–250 grams of mercaptan were added. The latex was finally coagulated and the product, after thorough kneading with isopropyl alcohol to remove all unreacted mercaptan, was a sticky rubbery product. The product was found by analysis to contain 10.6% sulfur, indicating a very substantial condensation of mercaptans with the double bonds. (The sulfur content of the pure mercaptan mixture is about 11.90%.) When dissolved in diisobutylene and its kinematic viscosity determined, its intrinsic viscosity was calculated to be 1.00. This product was completely soluble in mineral oils.

In order to determine the effect of this condensation product on the viscosity index and pour point properties of a lubricating oil the product was added to a solvent extracted Mid-Continent neutral SAE–10 viscosity grade oil, and the viscosity index and ASTM pour point where determined. The results obtained were as follows:

|  | Viscosity Index | ASTM Pour Point, °F. |
|---|---|---|
| Control, no additive | 114 | +5° |
| 0.4% of Product of Example I added | 130 | −15° |
| 1.2% of Product of Example I added | 141 | −5° |

Example II

An emulsion type polybutadiene latex was prepared in a manner similar to that used as starting material in Example I except that in the primary polymerization a larger amount of modifier or chain regulator was employed and the initial polybutadiene, instead of being rubbery in nature, was a very viscous liquid product. About 1 liter of the latex, containing about 25% solids content of the polybutadiene just described, was mixed with 1 liter of 2½% sodium soap solution containing 0.15% $K_2S_2O_8$. This was heated to 50° C. in a round bottom stirred flask and increments of a predominantly $C_{12}$ primary aliphatic mercaptan mixture added over a period of 3 days amounting in all to about 700 grams. At the end of this time the product was recovered by coagulating the latex followed by alcohol washing to remove all unreacted mercaptan. About 650 grams of product was obtained which contained 8.36% sulfur. Its kinematic viscosity in diisobutylene was measured and its intrinsic viscosity calculated to be about 0.18; the product was of oil-like consistency and was soluble in mineral oils.

In order to determine the effect of this condencation product on the viscosity index and pour point properties of a lubricating oil, the product was added to a solvent extracted Mid-Continent paraffinic neutral oil containing about 6% of extrated Mid-Continent bright stock and the viscosity index and pour point were determined. The results obtained were as follows:

|  | Viscosity Index | ASTM Pour Point, °F. |
|---|---|---|
| Control, no additive | 114 | +50 |
| 1.2% of Product of Example II added | 124 | −150 |
| 2.4% of Product of Example II added | 126 | −250 |

It is apparent from these results that the higher molecular weight product of Example I imparted very desirable V. I. improvement to the oil in which it was tested and improved the pour point properties somewhat. On the other hand, the lower molecular weight product from Example II gave more moderate improvement in V. I. but markedly improved the pour point qualities of the oil to which it was added. The proper choice of molecular weight range for an additive for optimum properties is a function of this invention.

Example III

An emulsion type copolymer, prepared from equal parts of butadiene and styrene in a manner similar to that described in Example I for the preparation of a rubbery polybutadiene, was isolated from the latex by coagulating the rubbery polymer by means of brine and isopropyl alcohol, mill washing the polymer to remove soap and salts, and then removing the moisture from the washed polymer by milling at 175° F. A total of 50 gms. of the dry polymer, 213 gms. of n-tetradecyl mercaptan and 1 gm. of sulfur were charged into a 2-liter 3-way flask fitted to a mechanical stirrer, thermometer and a condenser which was sealed from the atmosphere by means of oil traps. The reactants were agitated at room temperature until the polymer dissolved, and after complete solution the reactants were heated for a period of 66 hours at a temperature range of 180–190° C.

At the end of this time the copolymer-mercaptan adduct was isolated by dissolving the reaction mixture in petroleum ether (B. P. 30–70° C.) and precipitating the desired product by the addition of an excess of 99% isopropyl alcohol. The product was dissolved and precipitated as above until the alcohol-petroleum ether extract indicated the absence of free mercaptan by both the nitrosyl mercaptide and iodine tests. The purified copolymer-mercaptan adduct was analyzed for sulfur by the combustion method. The percentage of sulfur found was 8.46, which corresponds to a total of 73 per cent of the copolymer double bonds saturated by the mercaptan.

In order to determine the effect of this condensate on the viscosity index and pour point properties of lubricating oils the product was added to lubricating oil bases known as Base Oil A and Base Oil B, and the viscosity index and ASTM pour point were determined. The following results were obtained:

|  | Viscosity Index | ASTM Pour Point, °F. |
|---|---|---|
| BASE OIL A | | |
| Control, no additive |  | +30 |
| Control + ¼% of Product of Example III |  | +30 |
| Control + ½% of Product of Example III |  | +30 |
| Control + 1% of Product of Example III |  | +30 |
| BASE OIL B | | |
| Control, no additive | 114 | +5 |
| Control + ¼% of Product of Example III |  | −15 |
| Control + ½% of Product of Example III | 119 | −20 |
| Control + 1% of Product of Example III | 125 | −20 |

Note: Base oil A is a conventionally refined Mid-Continent neutral SAE–10 viscosity oil +3+½% of extracted Mid-Continent bright stock. Base oil B is a solvent extra^ted Mid-Continent neutral SAE–10 viscosity grade oil.

Example IV

An emulsion type copolymer composed of equal parts of butadiene and styrene was condensed with n-hexadecyl mercaptan. A total of 50 gms. of the copolymer and 238 gms. of n-hexadecyl mercaptan were employed. The preparation of the copolymer, the isolation of the dry polymer, the reaction time and temperature, catalyst, and the isolation and purification of the final copolymer-hexadecyl mercaptan adduct was the same as described in Example III.

The final product was found by analysis to contain 7.39% sulfur, indicating that 62% of the copolymer double bonds were saturated by the hexadecyl mercaptan.

The effect of this adduct on the viscosity index and pour point properties of a lubricating oil was determined by adding the product to the same base oils described in Example III and determining the viscosity index and ASTM pour point. The results obtained are as follows:

|  | Viscosity Index | ASTM Pour Point, °F. |
|---|---|---|
| BASE OIL A | | |
| Control, no additive | | |
| Control, +¼% of Product of Example IV | | +30 |
| Control, +½% of Product of Example IV | | −10 |
| Control, +1% of Product of Example IV | | −10, −5 |
| BASE OIL B | | |
| Control, no additive | 114 | +5 |
| Control, +¼% of Product of Example IV | | 0 |
| Control, +½% of Product of Example IV | 120 | +5 |
| Control, +1% of Product of Example IV | 125 | +10 |

Example V

Three hundred gms. of a copolymer of equal parts of butadiene and styrene in the form of a latex containing 27.75% solid polymer, freshly stripped of monomeric materials, was reacted with 169 gms. of mercaptans derived from cocoanut oil alcohols at a temperature of 50° C. for a period of 66 hours. The reaction was catalyzed by the addition of potassium persulfate, 9 gms., over a period of 24 hours. At the end of 66 hours the reaction mixture was poured into a mixture of isopropyl alcohol (99%) and petroleum ether. The adduct and unreacted mercaptan were extracted into the alcohol-petroleum ether layer thereby causing it to separate from the aqueous soap-alcohol-mercaptan layer. The latter was drawn off and the solution of the product was water washed to remove the soap used in preparing the original latex. The product, after being water washed, was then purified by a repeated precipitation by means of 99% isopropyl alcohol and solution in petroleum ether. The unreacted mercaptan was thereby removed from the desired product. The product was found by analysis to contain 6.87% sulfur.

The following effect on viscosity index and pour point was exhibited by the above product when added to the same base oils as in Example III.

|  | Viscosity Index | ASTM Pour Point, °F. |
|---|---|---|
| BASE OIL A | | |
| Control, no additive | | +30 |
| Control, +¼% of Product of Example V | | +30 |
| Control, +½% of Product of Example V | | +30 |
| Control, +1% of Product of Example V | | +30 |
| BASE OIL B | | |
| Control, no additive | 114 | +5 |
| Control, +¼% of Product of Example V | | −15 |
| Control, +½% of Product of Example V | 128 | −25 |
| Control, +1% of Product of Example V | 137 | −25 |

Example VI

Two hundred and twenty-six gms. of a 22.10% solids polybutadiene latex was mixed with 10 gms. of a mono hydroxy polyether type of emulsifier in 70 cc. of water, and 135.5 gms. of a n-octyl mercaptan. The mixture was contained in a 2-liter 3-way flask fitted to a mechanical stirrer, thermometer and return condenser sealed from the atmosphere by means of oil traps. The reaction mixture was kept at 50–60° C. for a period of 66 hours. A catalyst solution of 5.45 gms. of potassium persulfate in 136 cc. of water was added to the reaction mixture at intervals over a 23 hour period. The polybutadiene-n-octyl mercaptan adduct was isolated according to the procedure described in Example V. The final purified adduct showed by analysis 12.55% sulfur.

The effect of this adduct on the viscosity index and pour point properties of a lubricating oil was determined by adding the product to the same lubricating base oils as in Example III and the viscosity index and ASTM pour point determined. The results obtained were as follows:

|  | Viscosity Index | ASTM Pour Point, °F. |
|---|---|---|
| BASE OIL A | | |
| Control, no additive | | +30 |
| Control, +¼% of Product of Example VI | | +30 |
| Control, +½% of Product of Example VI | | +35 |
| Control, +1% of Product of Example VI | | +30 |
| BASE OIL B | | |
| Control, no additive | 114 | +5 |
| Control, +¼% of Product of Example VI | | +5 |
| Control, +½% of Product of Example VI | 122.6 | +5 |
| Control, +1% of Product of Example VI | 129 | +5 |

It will be noted from Examples III, IV, V, and VI that all of the adducts tested showed viscosity index improving properties, and pour depressing activity was limited to one or the other of the two base oils used. For example, the product obtained by condensing a copolymer of equal parts of butadiene and styrene with tetradecyl mercaptan, Example III, showed pour activity in the Base Oil B, but not in Base Oil A, and a corresponding adduct prepared from hexadecyl mercaptan, Example IV, showed the reversed order of activity. It was found that an enhanced pour activity could be obtained by employing physical mixtures of the various adducts described in Examples III, IV, V, and VI. A summary of the data obtained in this connection are presented in the table entitled, "Summary of pour data for physical mixtures of adducts containing varying molecular weight mercaptans."

The foregoing description contains a limited number of embodiments of the present invention. It will be understood, however, that many variations are possible without departing from the Summary of pour data for physical mixtures of adducts containing varying molecular weight mercaptans

| Polymer-Mercaptan Adduct | Ratio of Adducts (A) to (B) | | ASTM Pour Point, °F. in Oil A | | | ASTM Pour Point, °F. in Oil B | | |
|---|---|---|---|---|---|---|---|---|
| | | | 1% | ½% | ¼% | 1% | ½% | ¼% |
| Product of Example V (A) | 100 | 0 | +30 | +30 | +30 | −25 | −25 | −15 |
| Product of Example IV (B) | 0 | 100 | −5 | −10 | −10 | +10 | +5 | 0 |
| | 25 | 75 | −10 | −10 | −15 | 0 | −5 | −5 |
| | 50 | 50 | −30 | −20 | −10 | −15 | −10 | −10 |
| | 75 | 25 | <−35 | −30 | −10 | −20 | −15 | −15 |
| Product of Example III (A) | 100 | 0 | +30 | +30 | +30 | −20 | −20 | −15 |
| Product of Example IV (B) | 0 | 100 | −5 | −10 | −10 | +10 | +5 | 0 |
| | 25 | 75 | −15 | −10 | −10 | −5 | −5 | −5 |
| | 50 | 50 | −25 | −30 | −25 | −10 | −20 | −10 |
| | 75 | 25 | <−35 | <−35 | −25 | −15 | −25 | −20 |
| Product of Example VI (A) | 100 | 0 | +30 | +30 | +30 | +5 | +5 | +5 |
| Product of Example IV (B) | 0 | 100 | −5 | −10 | −10 | +10 | +5 | 0 |
| | 25 | 75 | −5 | −10 | −10 | 0 | 0 | 0 |
| | 50 | 50 | −15 | −10 | −10 | 0 | 0 | 0 |
| | 75 | 25 | −15 | −15 | −5 | 0 | 0 | 0 |

Example VII

A 1-liter 3-way flask fitted with a mechanical stirrer, thermometer and return condenser sealed from the atmosphere by means of oil traps, was charged with 50 gms. of a dry copolymer composed of 43.5 parts butadiene and 56.5 parts of alpha methyl, para methyl styrene, which was prepared in emulsion and isolated therefrom, and 159 gms. of n-hexadecyl mercaptan, and ½ gm. of sulfur. The mixture was agitated for a period of 72 hours at 180° C. At the end of this time the product was isolated according to the procedure described in Example III. The purified copolymer-mercaptan adduct analyzed 6.18% sulfur. The original polymer showed an intrinsic viscosity value of 0.445 and the value for the above product was 0.373 in toluene solution.

The above adduct was added to the same lubricating oil bases A and B as used in Example III and the viscosity index and ASTM pour points determined in order to find the effect of this product on the viscosity index and ASTM pour point. The following results were obtained:

| | Viscosity Index | ASTM Pour Point, °F. |
|---|---|---|
| BASE OIL A | | |
| Control, no additive | | +30 |
| Control, + ¼% of Product of Example VII | | −15 |
| Control, + ½% of Product of Example VII | | −20 |
| Control, + 1% of Product of Example VII | | −20 |
| BASE OIL B | | |
| Control, no additive | 114 | +5 |
| Control, + ¼% of Product of Example VII | | −10 |
| Control, + ½% of Product of Example VII | 119 | −10 |
| Control, + 1% of Product of Example VII | 125 | −10 | spirit and scope of the invention as defined in the following claims.

What we claim and desire to secure by Letters Patent is:

1. A lubricating composition consisting essentially of a mineral lubricating oil and from 0.05 to 10 weight per cent based on the oil of an oil soluble condensation product, obtained by condensing with aid of a peroxide catalyst of from 50 to 80 parts of a vulcanizable rubbery hydrocarbon polymer prepared by the polymerization in aqueous emulsion, said polymer being selected from the group which consists of polybutadiene-1,3 and copolymer of butadiene-1,3 with a monomer containing a polymerizable vinyl group, and 50 to 700 parts of a primary aliphatic mercaptan containing from 8 to 18 carbon atoms per molecule, said condensation occurring at a temperature ranging from 50 to 60° C., said condensation product having a sulfur content in the range of 6.18 to 10.6 weight per cent.

2. A lubricating composition consisting essentially of a mineral lubricating oil and 0.05 to 10 weight per cent based on the oil of an oil soluble condensation product which consists of 50 to 700 parts of a mixture of predominantly $C_{12}$ primary aliphatic mercaptans condensed with 50 to 80 parts of an initially vulcanizable rubbery polymer prepared by the polymerization in aqueous emulsion of butadiene-1,3, said condensation occurring with aid of a peroxide catalyst at a temperature in the range of 50 to 60° C., said condensation product having a final sulfur content of 6.18 to 10.6 weight per cent.

3. A lubricating composition as in claim 1 wherein the aliphatic mercaptan is n-tetradecyl mercaptan.

4. A lubricating composition as in claim 1 wherein the aliphatic mercaptan is n-hexadecyl mercaptan.

5. A lubricating composition as in claim 1 wherein the aliphatic mercaptan is a mixture of n-tetradecyl and n-hexadecyl mercaptans.

6. A lubricating composition consisting essentially of a lubricating oil and 0.05 to 10 weight per cent based on the oil of an oil soluble condensation product which consists of 50 to 700 parts of a mixture of predominantly $C_{12}$ primary aliphatic mercaptans condensed with 50 to 80 parts of an initially vulcanizable rubbery polymer prepared by the polymerization in aqueous emulsion of a mixture of butadiene-1,3 and a comonomer containing a polymerizable vinyl group wherein at least 50% of the double bonds are reacted with said mercaptans, said condensation occurring with a peroxide catalyst at a temperature ranging from 50° to 60° C., said condensation product having a final sulfur content of 6.18 to 10.6 weight per cent.

7. A lubricating composition consisting essentially of a mineral lubricating oil and 0.05 to 10 weight per cent based on the oil of an oil soluble condensation product which consists of 50 to 700 parts of a mixture of predominantly $C_{12}$ primary aliphatic mercaptans condensed with 50 to 80 parts of an initially vulcanizable rubbery polymer prepared by the polymerization in aqueous emulsion of a mixture of butadiene-1,3 and styrene wherein at least 50% of the double bonds are reacted with said mercaptans, said condensation occurring with aid of a peroxide catalyst at a temperature ranging from 50° to 60° C., said condensation product having a final sulfur content of 6.18 to 10.6 weight per cent.

MILLER W. SWANEY.
GEORGE E. SERNIUK.

REFERENCES CITED

The following references are of record in the file of this patent:

UNITED STATES PATENTS

| Number | Name | Date |
| --- | --- | --- |
| 2,132,847 | Dietrich | Oct. 11, 1938 |
| 2,234,204 | Starkweather | Mar. 11, 1941 |
| 2,312,750 | Cohen | Mar. 2, 1943 |
| 2,364,830 | Towne | Dec. 12, 1944 |
| 2,382,700 | Eby | Aug. 14, 1947 |

Certificate of Correction

September 6, 1949

Patent No. 2,481,257

MILLER W. SWANEY ET AL.

It is hereby certified that error appears in the printed specification of the above numbered patent requiring correction as follows:

Column 3, lines 72, 73, and 74, in the table, third column thereof, for $$\begin{matrix} +50 \\ -150 \\ -250 \end{matrix} \quad \text{read} \quad \begin{matrix} +5° \\ -15° \\ -25° \end{matrix}$$

and that the said Letters Patent should be read with this correction therein that the same may conform to the record of the case in the Patent Office.

Signed and sealed this 25th day of April, A. D. 1950.

[SEAL]

THOMAS F. MURPHY,
*Assistant Commissioner of Patents.*